United States Patent
Haverlag et al.

(10) Patent No.: US 12,369,100 B2
(45) Date of Patent: Jul. 22, 2025

(54) EFFICIENT COMMISSIONING OF A WIRELESS CONTROL SYSTEM

(71) Applicant: SIGNIFY HOLDING B.V., Eindhoven (NL)

(72) Inventors: Marco Haverlag, Mierlo (NL); Leendert Teunis Rozendaal, Valkenswaard (NL); Bozena Erdmann, Aachen (DE); Bas Driesen, Weert (NL); Paulus Jacobus Zander, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 339 days.

(21) Appl. No.: 17/922,355

(22) PCT Filed: Apr. 28, 2021

(86) PCT No.: PCT/EP2021/061134
§ 371 (c)(1),
(2) Date: Oct. 29, 2022

(87) PCT Pub. No.: WO2021/224089
PCT Pub. Date: Nov. 11, 2021

(65) Prior Publication Data
US 2023/0180100 A1  Jun. 8, 2023

(30) Foreign Application Priority Data
May 7, 2020 (EP) .................................... 20173396

(51) Int. Cl.
*H04L 12/00* (2006.01)
*H04W 40/22* (2009.01)
*H04W 40/32* (2009.01)

(52) U.S. Cl.
CPC .......... *H04W 40/32* (2013.01); *H04W 40/22* (2013.01)

(58) Field of Classification Search
CPC ..... H04W 40/32; H04W 40/22; H04W 40/24; H04L 45/74; Y02D 30/70
(Continued)

(56) References Cited

U.S. PATENT DOCUMENTS

| 9,191,886 B2 | 11/2015 | Ludlow et al. |
| 2016/0043942 A1 | 2/2016 | Purohit et al. |

(Continued)

FOREIGN PATENT DOCUMENTS

| CN | 102065575 A | 5/2011 |
| CN | 108135035 A | 6/2018 |

(Continued)

OTHER PUBLICATIONS

CN 106792745 A,, Wireless Self-organized Network-oriented Node Hierarchical Routing Scheduling Method, Involves Planning Route From Sending Node to Receiving Node Based on Node Neighbor Relationship and Node Hierarchical Relationship, 3 pages, 2017 (Year: 2017).*

(Continued)

*Primary Examiner* — Frantz Coby

(57) ABSTRACT

To improve the efficiency and reliability of communication in a large and high-density wireless network 100, it is beneficial to assign a subset of the plurality of nodes 500 being router nodes 200, and the rest of the nodes being non-router nodes 300. Thus, the dense wireless network 100 splits into a sparse core mesh network and many small star networks around each router node 200. However, to commission the plurality of nodes into such a hybrid topology can be quite complex and time-consuming. This invention discloses a commissioning method that makes use of one or more neighboring relationship established among the plurality of nodes to derive a proper role for an individual node, and then to configure the individual node to operate according to the role assigned. The disclosed commissioning method may be carried out semi-automatically or automatically.

14 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0123957 A1* | 5/2018 | Chen | ........................ H04L 45/26 |
| 2019/0207852 A1 | 7/2019 | Ko et al. | |
| 2021/0100055 A1* | 4/2021 | Liu | ...................... H04L 41/0833 |
| 2023/0180100 A1* | 6/2023 | Haverlag | .............. H04W 40/22 |
| | | | 370/329 |

FOREIGN PATENT DOCUMENTS

| | | |
|---|---|---|
| JP | 2007067891 A | 3/2007 |
| JP | 2019122032 A | 7/2019 |
| WO | 2011083389 A1 | 7/2011 |
| WO | 2018077864 A1 | 5/2018 |
| WO | 2018228883 A1 | 12/2018 |
| WO | 2019154999 A1 | 8/2019 |

OTHER PUBLICATIONS

CN 105553854 A, Method for Routing and Multi-casting Ad Hoc Wireless Network, Involves Sending Multi-broadcast Control Message By Network Node to Neighbor Node, and Determining Routing Relationship Between Network Node And Neighbor Node, 2 pages, 2016 (Year: 2016).*

* cited by examiner

EFFICIENT COMMISSIONING OF A WIRELESS CONTROL SYSTEM

CROSS-REFERENCE TO PRIOR APPLICATIONS

This application is the U.S. National Phase application under 35 U.S.C. § 371 of International Application No. PCT/EP2021/061134, filed on Apr. 28, 2021, which claims the benefit of European Patent Application No. 20173396.1, filed on May 7, 2020. These applications are hereby incorporated by reference herein.

FIELD OF THE INVENTION

The invention relates to the field of wireless control systems. More particularly, various methods, apparatus, systems and computer-readable media are disclosed herein related to a method for commissioning a wireless control system comprising a plurality of nodes to a wireless network.

BACKGROUND OF THE INVENTION

There is an ongoing trend in the professional lighting market to move more and more towards connected lighting systems, which enable all kinds of new features like (remote) scheduling, energy monitoring, sensor-based lighting control and asset management. In many cases these systems are installed in existing buildings, in which cases a wireless network is preferred to avoid having to deploy new cables (for lighting control) through the ceiling. Examples of such wireless network protocols which are used widely in current practice are open standards like Zigbee, Thread, Bluetooth LE (BLE), BLE mesh, Wi-Fi, Wi-Fi direct, and various proprietary network implementations built on top of the IEEE 802.15.4, IEEE 802.15.1 or IEEE 802.11 standards.

In many cases the network can be so large that not all nodes can be reached with a direct link from a central controller, and thus those remote nodes may need the help from one or multiple relaying nodes. Flooding-based routing approach is widely used to distribute control messages to a large number of nodes. A message is broadcasted and received by many nodes at the same time, and if each node repeats the message once or a few times, the chance of missing the message may be reduced to an acceptable level. Depending on the size and density of the network, the number of repeats can be configured (in some networks) in order to restrain the 'network storm' that happens during a broadcast. Without such constraint, each node would typically resend the message a couple of times, and thus, a single broadcast message in a 200-node network may easily lead to thousands of re-transmissions.

However, for a control system comprising a large number of nodes deployed in a high density, collisions may occur quite often because many nodes are in the direct communication range. Such flooding-based routing may not be very efficient.

SUMMARY OF THE INVENTION

In view of the above, the present disclosure is directed to methods, apparatus, systems, computer program and computer-readable media for providing a mechanism related to commissioning a large amount of nodes, based on one or more neighbouring relationships, into a mesh and star hybrid wireless network in a more efficient manner.

Accordingly, in order to configure a large and dense wireless system into a hybrid network topology with a combination of mesh and tree/star topologies in an efficient manner, collected neighbouring relationships among a plurality of nodes in the system are used to identify a core mesh network comprising purely router nodes for multi-hop routing, while the other nodes operate as non-router nodes that send and receive data via a router node within a direct communication range. Thus, the large and dense wireless system turns into the combination of a sparse core mesh network and many small star networks around the individual router nodes. Moreover, different options are disclosed to establish the overall neighbouring relationships in either a semi-automatic or fully automatic manner, and the involvement of a commissioning engineer may be further reduced.

In accordance with a first aspect of the invention a method is provided. A method of commissioning a plurality of nodes to a wireless network operating according to a first communication protocol, the method comprises the steps of:

a) establishing one or more neighboring relationships among the plurality of nodes, and each one of the plurality of nodes is present in at least one of the one or more neighboring relationships;

b) configuring a subset of nodes out of the plurality of nodes to operate as router nodes by enabling a multi-hop routing capability for relaying messages in the wireless network; and c) configuring the rest of the plurality of nodes, other than the router nodes, to operate as non-router nodes, which do not relay messages by disabling the multi-hop routing capability when present;

and wherein the router nodes and the non-router nodes are configured based on the one or more neighboring relationships, such that within a direct communication range of a non-router node there is at least one router node.

In one example, the wireless network may be used as a one-to-many control network with a central controller or a gateway device and the plurality of nodes to be controlled. A control command distributed on the network may come from the central controller or from the cloud via the gateway device to one or more nodes in the system, as a broadcasting message or a unicast/multicast message depending on a certain type of control functions to be carried out. The central controller or the gateway device sends out control commands in a centralized manner to the large distributed network. In return, the plurality of nodes in the large distributed network may also provide feedback to the central controller or the cloud and thus provide status information related to functional devices or actuators controlled by the central controller or the cloud, either regularly or upon a certain event. The event can be a malfunction or change of operation of a functional device or an actuator, an event detected by functional device or an actuator, or a query received. There may be other sensors, besides actuators, co-located in the same area with the plurality of nodes. Thus, the status information may also comprise sensing data from the other sensors, such as data related to temperature, humidity, etc. Therefore, in one preferred example, the communication in the system can be one-to-many or many-to-one, wherein the plurality of nodes are the many nodes to carry out bi-directional communication with the only one central controller or gateway device in the system.

In such a large and dense wireless system, it is beneficial to employ a mixed mesh and tree/star network to carry out the communication in a more efficient and reliable manner. The router nodes are selected to build up a core network to provide connectivity for the entire system. In addition, a star network with a one-hop direct link around each router node is constructed mainly to reduce interference and to improve the performance of the system. On a large scale, the wireless system relies on the sparse multi-hop network to distribute messages to and to collect data from the plurality of nodes, especially for the nodes at the edge of the network.

Although it is beneficial to assign different roles to the nodes, the commissioning procedure to implement such configuration can be very complex and time-consuming. For example, it is desirable to reduce the number of router nodes to keep the core network as sparse as possible for the efficiency purpose. But on the other hand, in order to guarantee that the commissioned system enables full access to all nodes without leaving some nodes in isolation, certain level of redundancy may be necessary. Considering the trade-off between efficiency and reliability, it is disclosed in this invention to make use of the one or more neighboring relationships collected from the nodes to make the selection of the router nodes in an optimized manner. It may be advantageous to reduce the number of router nodes, such that each node out of the plurality of nodes is preferentially configured to operate as a non-router node, and the commissioning method will make sure that within a direct communication range of every non-router node there is at least one router node. It may also happen that although the node is in a direct communication range of a first router node, the node is still configured to be a router node to provide connectivity to a further node that is in the vicinity of the node but is outside the one-hop range of the first router node. There could also be situations where some more routers are employed, e.g. for capacity or robustness of the mesh network. Sometimes, connecting with too many non-router nodes may put undue burden on an individual router node, in terms of processing capability, storage, and communication bandwidth. Therefore, it is preferred to combine the neighbouring relationships among individual nodes in a centralized approach to derive a more efficient setup for the core network.

Sometimes certain prior knowledge of the system may be available, such as the total number of nodes in the system, the average density of the nodes, and an average direct communication range of a node. Hence, a rough estimation of the number of router nodes needed to provide a full coverage of the system may be derived. Such estimation may be quite accurate when the nodes are deployed in a relatively uniform manner. It may be even more beneficial to design a ratio between the number of router nodes against the total number of nodes. Such a ratio may be determined according to at least one of: the average distance between two nodes, the average one-hop communication range, power supply conditions, application requirements, and the design choice between efficiency and reliability. Such a ratio may provide a guideline in determining a certain node should be a router node or not.

Given the large scale of the system, it is also desirable that the commissioning procedure may be carried out with less involvement of a commissioning engineer, and in a semi-automatic or automatic way.

In another embodiment, the method further comprises the step d) associating each one of the non-router nodes to a router node within a direct communication range, and wherein sending a unicast message to a non-router node is carried out via the corresponding router node.

When there is a broadcast message generated, each router node will rebroadcast or relay the same message to distribute the information to the plurality of nodes on the network. A non-router node may receive the same broadcast message from more than one router node located in the direct communication range of the non-router node. Such redundancy may not be most efficient in some occasions, but it may help to improve the reliability in some other occasions. For example, due to sporadic interference in the surroundings, a message relayed by one router node may be corrupted or of low signal quality. And then, it is beneficial to receive a duplicated message from another router node in the direct communication range.

However, when there is a unicast message generated for a certain non-router node, it is beneficial to assign one router node to represent the non-router node on the core mesh network for routing purpose. Different from a broadcast message, a unicast message is sent out along a route between a source node and a destination node. In this example, the destination node is the non-router node, and the source node may be the central controller, the gateway, or another node in the network. Although there may be more than one router node in the direct communication range of the intended non-router node, it is beneficial to appoint only one router node to represent the non-router node on the mesh network to avoid any confusion or waste of resources, when building up the unicast route and delivering the message. Preferably, a non-router node is associated to a router node in its vicinity, which has better connection with the non-router node than any other candidate router nodes.

To send a message generated by the non-router node, the non-router node can, but does not necessarily need to, send via the associated router node. In one example, the non-router node might know about another router node, other than the associated router node, in the vicinity because of a previously received broadcast message. The non-router node may simply send the message via that router node, especially when a good link quality is detected with a recently received message from that router node.

In a preferred embodiment, in order to perform network maintenance after commissioning, the steps of the method are repeated on a regular basis or upon a trigger event, and the trigger event can be at least one of a change of a node's position, a change of a node's powering status, a change of a traffic pattern, a change of a system setup, and a change of a link quality between two nodes out of the plurality of nodes.

The aforementioned method is mainly to improve the efficiency during commissioning stage to configure a large and dense wireless system into a hybrid network topology. However, the same method may also be used for network maintenance purposes by repeating the steps on a regular basis or based on a trigger event. This is because the one or more neighboring relationships may also change over time, and the original configuration determined based on the initial neighboring relationships during the commissioning stage may not be optimal anymore. For example, a node configured to be a router node may have a malfunction. Some old nodes may be removed from the system, while some new nodes may be added to the system. There may be a layout change in the office area or in a factory, and some of the connections between nodes may get blocked; or in a home/office environment, e.g. closing of a door or movement of furniture; also a portable node (such as Hue Go) may be moved around; a node may have its mains powered removed (mains power switch). It may also happen there is a new deployment of the central controller or the gateway. In a smart lighting context, one example leading to an update of neighboring relationships can be a change to a different layout for doing an over-the air (OTA) programming or for deploying a new lighting scene or lighting context, whereby the inter-relations between different nodes need to be reconfigured, e.g. associating a different switch or sensor with the lighting device in a particular area. Hence, it can be very beneficial to execute the same procedure to refresh the configuration of the hybrid topology in order to accommodate changes in the system.

In another embodiment, step a) of the method further comprises:
preselecting a first subset of the plurality of nodes as temporary router nodes;
querying each temporary router node for at least one neighboring relationship around each temporary router node;
wherein the temporary router nodes are preselected in such a manner that each one of the plurality of nodes is found at least once by one of the neighboring relationships queried from the temporary router nodes.

In order to establish the one or more neighboring relationships, it is possible to query each node in the system to provide information on its perceived neighbours, thereby establishing a relationship of the queried node with each of the reported neighbours. However, in a large and dense network, it may take a quite long procedure to query all the nodes one by one. Furthermore, this may also result in a lot of redundant information, considering that each node may have many neighboring nodes in the direct communication range and similar neighboring relationships are identified by these nodes. Therefore, it may be more beneficial to preselect a subset of the plurality of nodes, as temporary router nodes, for collecting the neighboring relationships.

The temporary router nodes may be preselected in a quasi-random manner. Preferably, more temporary router nodes will be selected than the number of router nodes in the system once commissioned. As disclosed above, with certain prior knowledge of the system, a rough estimation of the number of router nodes needed to provide a full coverage of the system may be derived with a good accuracy. Based on such information, the temporary router nodes may be purposely preselected with a higher density than the eventual number, or planned router nodes, because the mission of the temporary router nodes is to create an overview of the neighboring relationships in the system rather than to build up an efficient core mesh network.

In one example, the temporary router nodes are preselected one by one manually by a commissioning device via a point-to-point wireless connection according to a second communication protocol, or via the wireless network, and wherein the second communication protocol is different from the first communication protocol.

As one option, the temporary router nodes are preselected manually by a commissioning device, which may be controlled by a commissioning engineer. The commissioning engineer may select manually a subset of nodes as temporary router nodes according to a simple rule when he walks around the area where the plurality of nodes are deployed. For example, he may select for each room a node close to the entrance as a temporary router node. He may also select one out of every certain number of nodes, depending on the density of the deployment of the nodes.

The commissioning device may connect to the nodes via a point-to-point connection according to a second communication protocol. Here we consider a point-to-point connection also covers a point-to-multipoint connection. Such a point-to-point or point-to-multi-point connection are featured by one hop direct link, which has an advantage of easy setup. To select a temporary router node, the commissioning engineer may control the commissioning device to send a message to invite that node via the point-to-point connection, such as a beacon message. Since the commissioning device is close to the selected node, an additional requirement on proximity, such as a predefined RSSI threshold, may be used to exclude another nearby node to pick up the invitation wrongly.

Alternatively, the commissioning device may connect to the nodes via the wireless network according to the first communication protocol. Hence, in this approach, it may require that the plurality of nodes or part of the plurality of nodes and the commissioning device are connected to the same wireless network. One way to add new nodes to a network is accomplished by having one wireless device (in most cases a central controller, a gateway or bridge device) open a wireless network and let the new wireless nodes automatically join this network, which is called auto-joining process. After the network has been formed in this way, the nodes will typically appear in a random manner, which means that quite some time will be needed in locating the devices. In a smart lighting application, it also means that the commissioning engineer may have to identify each fixture one-by-one by sending blink commands to each device and register each device to its location of group. In this example, additional proximity criteria, such as based on received signal strength indicator (RSSI), may be used by the commissioning device to pick up a node in the vicinity to operate as a temporary router node.

In another example, the temporary router nodes are preselected automatically according to a predefined rule, either by the plurality of nodes themselves, or by a commissioning device via a point-to-point wireless connection according to a second communication protocol, or by a central controller on the wireless network, and wherein the second communication protocol is different from the first communication protocol.

In one preferred option, the temporary router nodes are preselected automatically according to a predefined rule. Such automatic procedure may be carried out by the plurality of nodes themselves. For example, each node may have a unique identifier, and according to a feature of the unique identifier, each node may determine independently if it should be a temporary router node or not. Such a unique identifier may be a long address, such as a media access control (MAC) address according to an IEEE 802 standard. Depending on the predefined rule, certain nodes with MAC addresses fulfilling the predefined rule will select themselves as the temporary router nodes. As one example, the predefined rule may specify that a node with a MAC address ending in one, or two, or more zero bits becomes a temporary router node, or the MAC address is dividable by a number L. By changing the predefined rule, the ratio between the number of temporary router nodes and the number of the other nodes can be adjusted accordingly.

The temporary router nodes may also be preselected automatically by the commissioning device via the point-to-point wireless connection. As one example, the commissioning device may automatically send out a beacon via the point-to-point connection periodically with a fixed interval to invite a node in the vicinity to become a temporary router node. Along with the beacon message, a proximity requirement may be raised, such as by setting a strict RSSI threshold. Hence, each time there may be only one node in the close vicinity can fulfill the requirement and get registered as a temporary router node. When the commissioning engineer walks around in the area with the commissioning device, the temporary router nodes are also selected without further administration of the commissioning engineer.

Alternatively, the temporary router nodes may be preselected automatically by the central controller or gateway device on the wireless network. In this case, the plurality of nodes or part of the plurality of nodes may first connect to the network according to the auto-joining procedure as described. And then, the central controller or gateway device may assign a node to be a temporary router node according to the sequence or order that the nodes get connected or according to a temporary network address allocated to the node. As one example, the central controller or gateway device may assign a temporary router node every ten nodes get connected to the network. In another example, the central controller or gateway device may also assign a temporary router node when the temporary network address of that node fulfills a certain predefined criterion, similar to the approach applied to the MAC address as disclosed above.

Advantageously, the wireless point-to-point connection is operated in accordance with a Bluetooth Low Energy, BLE, protocol.

In one example, the point-to-point connection according to the second communication protocol may also be a point-to-multipoint connection. In a preferred setup, the second wireless communication protocol is in accordance with a Bluetooth Low Energy, BLE, standard. It is beneficial for the commissioning device to make use of the easy setup of point-to-point or point-to-multipoint connections, such as BLE beacons, to set up a link with a node in the vicinity.

Preferably, the neighboring relationship is a neighboring table comprising a list of neighbour nodes out of the plurality of nodes within a direct communication range, and each node on the list is identified with a predefined unique identifier of that node.

The neighboring relationship may be obtained via the wireless network according to the first wireless communication protocol or via the point-to-point connection according to the second wireless communication protocol.

As one option that the neighboring relationship is obtained via the wireless network, the plurality of nodes may first join the wireless network opened by the central controller or the gateway device according to the auto-joining procedure as described above. And then, each node may send out a broadcast message to request address information of the nodes in the direct communication range or a single-hop distance, and the neighboring relationship is formulated based on the responses received from those neighboring nodes in the vicinity.

As a second option, the neighboring relationship may also be obtained directly via the point-to-point connection without joining the wireless network. Each node that is capable to support the second communication protocol can send out a message, such as a BLE beacon, to its neighboring nodes in the one-hop direct communication range. Then the neighboring table can be created by the node by recording the responses from the neighboring nodes. One benefit of establishing the neighboring table via the point-to-point connection is flexibility, since the procedure can be carried out independent of the wireless network, or even before the wireless network is created.

Both options may also be implemented in a more efficiently manner via the preselection of temporary router nodes. Instead of making each one of the plurality of nodes to build up a local neighboring table, only the temporary router nodes are instructed to collect such information, such as upon the preselection of being a temporary router node or upon a query to provide the neighboring relationship to the commissioning device, or the central controller/gateway device.

Advantageously, the neighboring table further comprises a signal characteristic for each node on the list, the signal characteristic quantifying proximity to a respective neighbour node.

The neighboring table may comprise more information other than a unique identifier of each neighboring node. For example, proximity information reflected by a signal characteristic can be quite useful. The signal characteristic may be a RSSI, or another link quality indicator of the responses received from the neighboring nodes. Such proximity information can be especially beneficial for a dense network, where each node may have quite a few neighboring nodes in the direct communication range. Router nodes can be selected more intelligently based on the further proximity information. For example, it may happen that a node with more neighbors is not always a better candidate to become a router node, as compared to another node with less neighbors but better link qualities with its neighbors.

In a preferred setup, the wireless network is operated in accordance with a Zigbee protocol.

Zigbee standard is widely adopted in home automation and lighting control applications. The Zigbee network layer natively supports both star and tree networks, and generic mesh networking. The powerful topology control provides it great flexibility in a control system, especially for reaching destination nodes that are far away from a source node without a direct link.

However, in a large dense network, allowing each node to operate as a router node to relay messages may result in a significant performance degradation, due to frequent packet collisions and excessive redundancy. The split of a large dense network into a sparse core network comprising router nodes with multi-hop capability according to the Zigbee protocol and many small local star networks comprising non-router nodes around each router node may greatly improve the efficiency of the wireless system, in terms of more usable bandwidth, less interference and reduced latency.

Beneficially, the selection of router nodes and non-router nodes further comprises an address assignment scheme of:
  assigning each one of the plurality of nodes a network address for operating on the wireless network, and the network address comprising a first subfield and a second subfield; and
  wherein the first subfield is set to a first value to uniquely distinguish a router node from another router node, and the first value is shared by the router node and one or more non-router nodes associated to the router node, and the second subfield is set to a second value to uniquely distinguish the router node and the one or more associated non-router nodes from one another; and
wherein the first subfield of the network address is used for a unicast message to be addressed via multi-hop relaying to reach a router node, when the unicast message has an intended destination of either the router node or a non-router node associated to the router node; and the second subfield of the network address is to identify the intended destination out of the router node and the one or more non-router nodes associated to the router node.

Given that routing in a large-scale network can be quite challenging, the disclosed address scheme may be used in combination with the assignment of router nodes against non-router nodes to facilitate efficient routing to the non-router nodes. The network address assigned to each one of the plurality of nodes comprises a first subfield and a second subfield. The first subfield is set to a first unique value to uniquely identify a router node and one or more non-router nodes associated to the router node from all the other nodes in the system. The second subfield is set to a second unique value to further uniquely identify the router node and the one or more non-router nodes, which are associated to the router node, from one another. By using such an addressing scheme, routing becomes more straightforward and efficient. There is no need to store a very large routing table by the central controller or gateway device, or by router nodes in the system, since the routing table only needs to store the routing information to reach the router nodes rather than routing information to reach all the nodes. It can also help to reduce the overhead in unicast messages imposed by a source routing-based approach.

In a preferred system setup, the wireless system is for lighting control, and/or for controlling sensors and gathering sensing data.

In the preferred setup, the wireless system is used for lighting control, and it can also be used to gather status information and sensing data from actuators and sensors collocated with the lights or located close to the lights. In another example, the wireless system can also be a control system for building automation in offices or home, or for industrial control in a factory.

In accordance to second aspect of the invention a wireless system is provided. The wireless system comprises:
 a plurality of nodes; and
 a central controller configured to open a wireless network and to commission the plurality of nodes to the wireless network according to the present invention.

The wireless system comprises a central controller that opens the wireless network operating in accordance to a first communication protocol. As disclosed above, the central controller can also be a gateway device that communicates with the plurality of nodes via the wireless network and sets up the connection between the plurality of nodes and an external network. The central controller or the gateway device allows the plurality of nodes to join the network in a randomized manner via auto-joining. The plurality of nodes may detect neighboring information in a distributed way via the wireless network according to the first communication protocol or via a point-to-point connection. Preferably, temporary router nodes may be preselected automatically according to a predefined rule to speed up the procedure to collect the one or more neighboring relationship. By establishing the neighboring relationships, the central controller or the gateway device may select a subset of nodes as router nodes to build up the sparse core mesh network according to the neighboring relationships, and assign the other nodes as non-router nodes by disabling the routing capability when present. Thus, the configuration of the plurality of nodes into router nodes and non-router nodes is under the control of the central controller or the gateway device.

In accordance to a further aspect of the invention another wireless system is provided. The wireless system comprises:
 a plurality of nodes;
 a central controller configured to open a wireless network; and
 a commissioning device configured to commission the plurality of nodes to the wireless network according to the present invention.

In another setup, the wireless system also comprises a commissioning device, which can make the configuration more efficient. The commissioning device may connect to a node in the system via a point-to-point connection or via the network. The easy setup of a point-to-point connection provides more flexibility to the system. The commissioning device may use the point-to-point connection to provide network credentials to a certain node in the proximity to allow the node to join the network in a more selective manner. The commissioning device may also use the point-to-point connection to read out the neighboring information from a certain node, and thus to collect the neighboring relationships either manually or automatically. The computation based on the neighboring relationships to derive the subset of router nodes may also be carried out by the commissioning device. Thus, the configuration of the plurality of nodes into router nodes and non-router nodes is under the control the commissioning device.

The invention may be embodied in a distributed computer program comprising code means which, when the program is executed by a plurality of nodes each comprising processing means, cause the processing means comprised in the plurality of nodes to perform the method according to the present invention in a collective manner.

The invention may further be embodied in a computer program comprising code means which, when the program is executed by a node comprising processing means, cause the processing means to perform the method according to the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
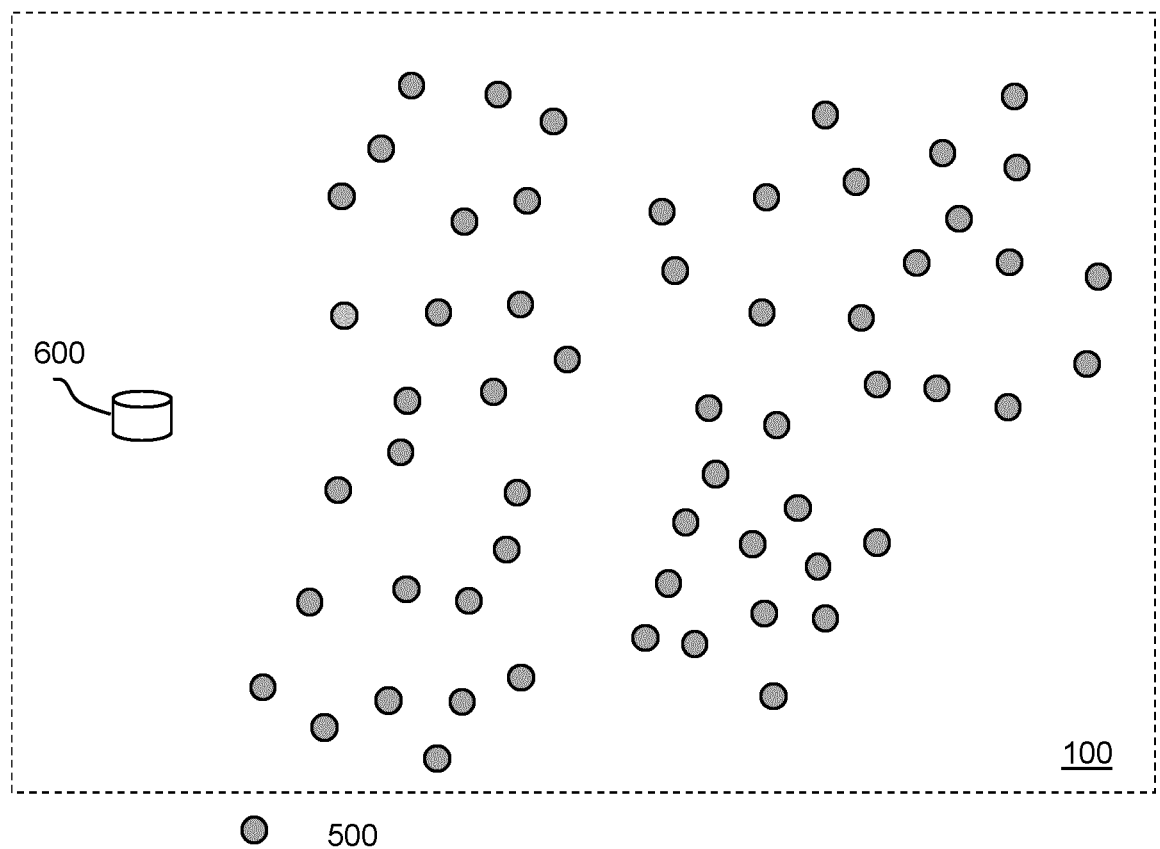
FIG. 1 demonstrates a wireless system with a plurality of node distributed in a high density.

Various embodiments of the present invention will now be described based on a wireless network 100 comprising a plurality of nodes 500, as shown in FIG. 1. The network can be a local network under the control of a local coordinator 600 to serve a certain control purpose. The network can also be connected to the cloud or a backbone network, via 600 a gateway, a bridge, or a router device. In a lighting context, a node 500 may be comprised in a lighting device, a luminaire, a sensor, or a switch to serve for the communication function of the lighting device, the luminaire, the sensor, or the switch. A node 500 may also be comprised in a HVAC system, a smart refrigerator, a smart oven, other smart white goods, or a remote controller in a broader building/home automation context.

Considering the system may comprise a large number of nodes, transmission from those nodes may conflict with each other, especially when they are deployed with a high density. Note that a high-density network here indicates a substantial part of the nodes in the network sees more than one neighbour node, and possibly there are two or more nodes in a one hop direct communication range of an individual node in the network. The present invention aims to improve the efficiency to commission such a large-scale dense network into a combination of a sparse mesh network and many local star networks around each router node in the mesh network.

Figure 2:
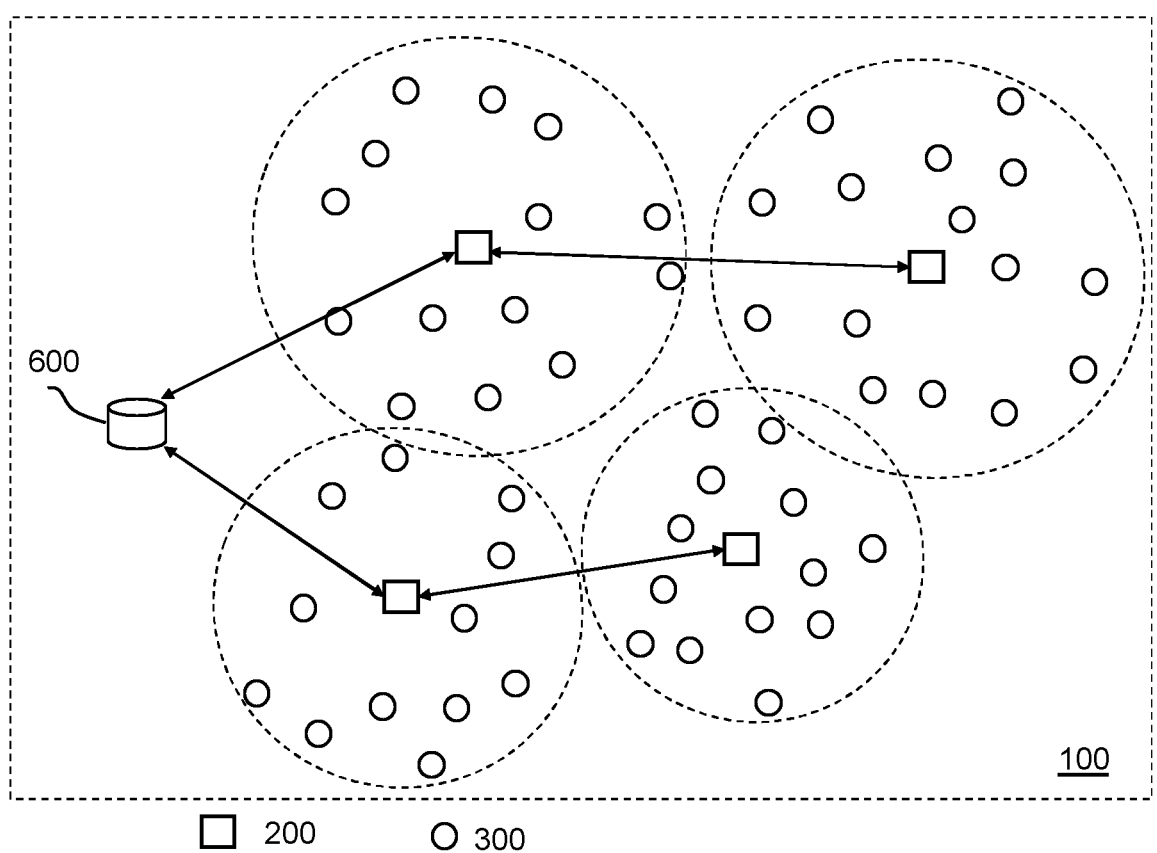
FIG. 2 demonstrates a wireless system with multi-hop communication on the sparse network according to the first communication protocol.

To achieve this goal, the present invention proposes to select a subset of the plurality of nodes as router nodes while the rest remain non-router nodes, as demonstrated in FIG. 2. Being configured to be a router node 200, the node operates according to the first communication protocol with the routing capability enabled. A router node 200 is operable to distribute a control command to the plurality of nodes 500 and to forward status information from the plurality of nodes 500, via multi-hop routing. Thus, router nodes build up a sparse multi-hop network according to the first communication protocol, which act as a kind of core network of the wireless system. Around each router node 200 with one-hop direct link, a local star network is built up, as indicated with a dash circle in FIG. 2. A local star network comprises one or more non-router nodes 300. In an extreme case, some router nodes 200 may have zero non-router node associated, such as in certain areas where the network is locally of low density. A non-router node 300 may be configured to operate according to the first communication protocol with the routing capability disabled. For a broadcast message, the non-router node can receive it directly from at least one router node in the vicinity. Optionally, the non-router node may also be configured to operate mainly according to the second communication protocol, such as to support a second application in addition to the main application carried out by the wireless network. In that scenario, in order to deliver a message to such a non-router node, it may happen that the router node will take extra effort to switch to an operation according to the second communication protocol in an on-demand manner, or the non-router node needs to rotate between the two operation modes regularly to be able to obtain messages from the wireless network using the first communication protocol.

FIG. 2 demonstrates bi-directional multi-hop communication on the sparse network according to the first communication protocol. The sparse multi-hop network comprises the router nodes, and acts as the core network of the wireless system. Thus, the router nodes bear the responsibility to guarantee the connectivity of the entire system, especially for the nodes that are far away from the central controller or the gateway. By making the wireless network sparse in view of multi-hop routing according to the first communication protocol, the mutual interference among neighbouring nodes is significantly suppressed. Reduced packet collisions and retransmissions also improve the efficiency of the system, in terms of both power consumption, latency, and available (usable) network bandwidth.

The local star network around each router node may operate according to the first communication protocol by disabling the multi-hop routing capability or operate according to the second communication protocol via the point-to-point connection as disclosed above.

The first wireless communication protocol is mainly to implement large scale information distribution and collection in a wireless control system with a plurality of nodes, whereas the control system can be used for lighting control and/or building automation. It is important that the first wireless communication protocol supports multi-hop routing, which can be Zigbee, Thread, Bluetooth Mesh, Wi-Fi mesh, WirelessHART, SmartRF, CityTouch, IP500, Z-wave, or any other mesh or tree-based technology.

It is preferred that the second communication protocol is in accordance with a Bluetooth low energy, BLE, standard. It can also be Wi-Fi direct, Zigbee Inter-PAN, Zigbee Touchlink, or another wireless communication standard that favours an easy setup for point-to-point connection.

Given that the two communication systems according to the first and the second communication protocols may use different frequency plans and time scheduling, one potential benefit that the local star network around each router node operating according to the second communication protocol is that mutual interference may be reduced significantly as compared to a homogeneous network.

The selection of the router nodes is based on the established one or more neighboring relationships. In a most basic setup, the one or more neighboring relationships are collected from each one of the plurality of nodes 500 in the system 100. Such a procedure may be quite time consuming considering the scale of the system. The high density of the network may also lead to lots of redundant information being collected and processed, which further reduce the efficiency of the procedure. Therefore, the inventors recognize that the advantage to preselect a group of temporary router nodes to collect the neighboring relationships in a more efficient manner.

Figure 3:
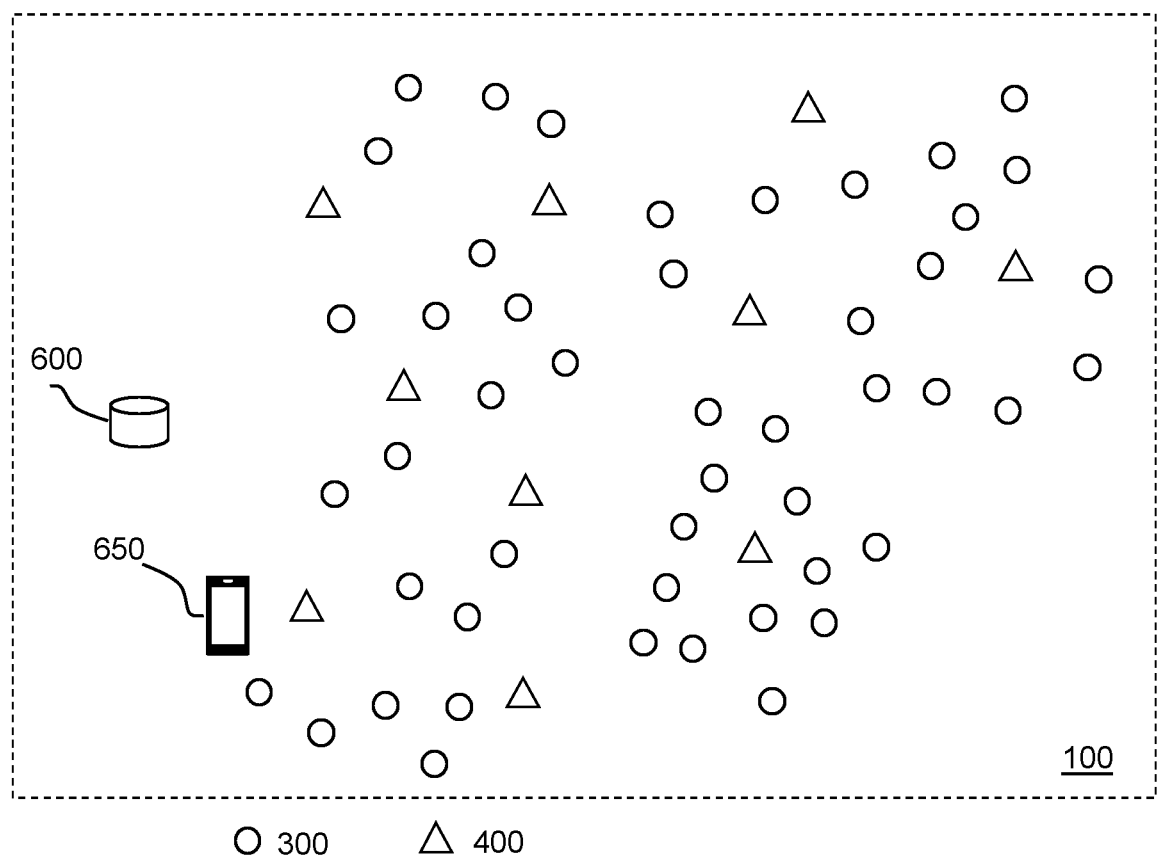
FIG. 3 demonstrates a wireless system with temporary router nodes assigned out of the plurality of nodes.

FIG. 3 demonstrates the wireless system with temporary router nodes preselected out of the plurality of nodes. As one option, the temporary router nodes are preselected manually by a commissioning device 650, which may be controlled by a commissioning engineer. The commissioning engineer may select manually a subset of nodes 500 as temporary router nodes 400 according to a simple rule when he walks around the area where the plurality of nodes 500 are deployed. For example, he may select for each room a node close to the entrance as a temporary router node. He may also select one out of every certain number of nodes, depending on the density of the deployment of the nodes.

The commissioning device 650 may set up a point-to-point connection with an individual node 500 in the vicinity according to the second communication protocol. The commissioning device 650 may also provide network credentials related to the wireless network to the individual node 500 via the point-to-point connection. Thus, the joining method is based on out-of-band joining, since the second communication protocol is different from the first communication protocol. In one example, the network credentials and identifiers, such as Zigbee channel, Zigbee short panID, Zigbee extended panID, network key, link key, Zigbee short address, are uploaded by the commissioning device 650 to the individual node 500 over a BLE connection.

The commissioning device 650 may also join the wireless network and communicate with an individual node in the vicinity according to the first communication protocol. This also means that the individual node will first join the network according to an auto-joining procedure.

In another option, the temporary router nodes are selected automatically according to a predefined rule, either by the plurality of nodes 500 themselves, or by the commissioning device 650 via a point-to-point wireless connection according to a second communication protocol, or by the central controller 600 on the wireless network 100. The predefined rule may be defined according to a unique identifier of the node 500, a short network address of the node 500, a sequence/order of joining the wireless network, or another randomly generated value based on one attribute or activity of the node 500.

The disclosed invention may be implemented in several different scenarios, depending on the involvement of the commissioning device 650, the capability of the node 500, such as supporting the second communication protocol or not. For the ease of description, the different scenarios are explained by taking Zigbee as one example for the first communication protocol and BLE as one example for the second communication protocol.

Scenario 1. Zigbee-Only (Manual Selection of Router Nodes 200, Automatic Network Joining of Non-Router Nodes 300)

In the first stage of commissioning, after the central controller opens the Zigbee network, all the nodes 500 or only the temporary router nodes 400 are added to the Zigbee network. The temporary router nodes are selected individually, which may be carried out by trigger-based joining, i.e. the installer or commissioning engineer triggers only the nodes/devices 500 that will need to function as a router. The trigger for this joining could be done by different methods such as button press, specific power cycling, infrared (IR) pointing, laser pointing, button press, or proximity detection via a wireless signal, assisted by a commissioning device 650.

Preferably after this trigger-based joining process, the temporary router node 400 is assigned a network short address $AD_{R_i}$, which may be a random number, or a number according to a certain rule, such as a multiple of an integer number N. The extra rule may have the advantage on logically linking one or more non-router device 300 to a specific router short address, and guaranteeing the uniqueness of each short address of the non-router nodes 300 (which will be assigned a short address of $AD_{R_i}+j$, where $1 \le j \le N-1$). N should be chosen such that $N*M<65535$, where M is the maximum number of router nodes expected in the system, and N should be larger than the total number of non-router nodes 300 to be associated with each router node.

During the first stage of commissioning, the temporary router node 400 needs to be selected such that each non-router node 300 has preferably multiple, but at least one, neighbouring temporary router nodes 400. Hence, there is a sufficiently large amount of redundancy in the network. After the temporary router nodes 400 have been added to the network, the network is closed by the central controller.

In the second stage of the commissioning process, the temporary router nodes 400 are instructed (either by a unicast message or by a broadcast) to send out an InterPAN message which contains the instruction for each non-router node 300 to send a responding InterPAN message that contain its unique identifier, such as a Zigbee MAC-address. The temporary router nodes 400 collect these response messages and use the RSSI information derived from these messages to build a neighbour table of nearby devices. A neighboring table comprises the identifier information of the neighboring nodes and may also comprise signal characteristics or proximity information for each neighboring node, such as RSSI, LQI, or a distance indicator. In order to properly support the optimisation process at the central controller, the temporary router nodes 400 may store information about more non-router nodes 300 than what fits their neighbour/child table, so that the non-router nodes 300 with weaker signal or located a bit farther away from all temporary router nodes 400 also get represented.

After a pre-determined time period, the central controller or the gateway device 600 will query each temporary router node 400 for its neighboring relationship or the list of neighboring nodes. With the collected neighboring relationships from different temporary router nodes 400, the central controller or the gateway device 600 may use an optimization algorithm to decide which devices 500 should be configured as router devices 200, and for each router device 200 which are the non-router devices 300 should be associated. This assignment of non-router devices, such as a list of the non-router devices identified by Zigbee long addresses or Zigbee MAC address, is sent by the central controller to each of the determined router nodes 200. Upon receiving this information from the central controller, the router nodes 200 send a third InterPAN message to the specified non-router nodes 300, which will trigger these devices to join the network via that router node 200, and become associated to that router node 200. Subsequently the router node 200 sends the individual Zigbee short addresses to these nodes by a Zigbee unicast command or alternatively a fourth InterPAN message.

Based on the neighbour relationships, the optimization algorithm is used for topology optimization in selecting the set of router nodes, such that the number of routing nodes should be reduced as many as possible as long as the connectivity of the entire network is not affected. Different algorithms may be employed here, such as based on graph theory there are a group of algorithms developed to construct vertex cover in wireless sensor networks.

The network short addresses of a non-router node $AD_{NR_j}$ should preferably be given by $$AD_{NR_j}=AD_{R_i}+j, 1 \le j \le N-1 \quad (1)$$

Where $AD_{R_i}$ is the short address of the associated router node, which is preferably given by $$AD_{R_i}=i \cdot N \quad (2)$$

N−1 is the maximum number of non-router nodes to be associated with each router node.

In this way each non-router node 300 has a predictable short address that is directly tied to its associated router node 200 short address. This will significantly simplify the routing since a node or the central controller 600 to send a unicast message to a non-router node 300 does not need to know the route to that node but only to its associated router node 200. This may reduce the size of the routing table by (up to) a factor of approximately N.

Scenario 2. Zigbee+BLE (Manual Selection of Router Nodes 200, Automatic Network Joining of Non-Router Nodes 300)

In case the plurality of nodes 500 also support BLE communication, the above semi-automatic commissioning process can also be done in an alternative way. In this case the nodes 500 start with sending out connectable or non-connectable BLE advertisements to indicate their presence, and to build up the neighboring relationships. The temporary router nodes 400 may be added one by one to the network by the commissioning device 650 (e.g. a mobile phone). The commissioning device 650 sends the network credentials or identifiers (link key, network key, Zigbee channel, Zigbee short panID, Zigbee extended panID, Zigbee short address) to each temporary router node 400 and reads out the Zigbee long address or Zigbee MAC address, or another unique identifier, over the point-to-point BLE connection from each temporary router node 400. At this point, each temporary router node 400 is assigned a Zigbee short address according to (2).

After the selection of temporary router nodes 400, the central controller sends a command to all temporary router nodes 400 to start scanning for BLE advertisements from neighbouring nodes, or to use results from earlier scanning. And then, the temporary router nodes 400 may stop their own BLE advertisements and listen to the advertisements from neighbouring nodes. After a pre-determined time, the temporary router nodes 400 may create a (BLE) neighbour table based on the RSSI values, or another signal/link quality indicator, of the advertisements from neighboring devices (which are still advertising). This (BLE) neighbour table of each temporary router node 400 is then queried by the central controller over the Zigbee network. The central controller 600 may calculate the optimal combinations of assigning router nodes 200 and inform those router nodes 200 with a list of non-router nodes 300 to be associated with.

Upon receiving the list of non-router nodes 300, the router devices 200 set up a BLE connection with each of the non-router nodes 300 and send them the network credentials, adapting their Zigbee short network addresses to the address specified in (1). Alternatively, Zigbee auto-joining can be used, where each router node 200 allows only its intended non-router nodes to join by refusing joining requests from other nodes. In such an approach, all nodes 500 should be either by default in an auto-joining mode after power on (preferably at a low frequency), or the auto-joining mode needs to be triggered by a non-connectable BLE beacon sent from each router node, which further contains some network credentials of the intended non-router devices. After each device 500 has been added to the Zigbee network 100, they should immediately configure themselves according to the roles assigned, router nodes or non-router nodes.

Scenario 3. BLE+Zigbee (Automatic Selection of Router Nodes)

Starting from the semi-automatic commissioning process of scenario 2, the designation of the temporary router nodes 400 can also be done automatically. In this case the nodes 500 again start to send out connectable or non-connectable BLE advertisements to indicate their presence. After power up, each node 500 will also build up its RSSI-ordered (BLE) neighbour table by scanning for the BLE advertisements of other nodes in the vicinity.

The commissioning device 650 then automatically sets up BLE connections to each node one by one. Via the BLE connections, the commissioning device 650 sends the Zigbee network credentials to each device 500 and reads out the BLE neighbour table of each device 500. After this the commissioning device assigns a temporary Zigbee short address to the nodes 500. To avoid overloading the network at this point, it may be designed that only one out of every N nodes, the new node is selected to be a temporary router node 400, and the remaining N−1 nodes are non-router nodes 300. After the preselection of temporary router nodes 400, the commissioning device or network controller queries all temporary router devices 400 for their BLE neighbour tables (alternatively, this can be done by the commissioning device 650 at the time of providing the network parameters), and calculates the optimized set of router devices 200 and non-router devices 300, for which every router and non-router device has sufficient neighbouring router devices to be able to set up a route towards the central controller, or towards another node in the network. In case the commissioning device 650 is used for this step, the commissioning device subsequently may set up a BLE connection to one of the nodes, which is then used as a proxy to send Zigbee commands to the entire network. Otherwise, the commissioning device may also need to join the Zigbee network. In case the central controller is used, it is connected to the network to send Zigbee commands directly.

Using the temporary Zigbee short address of each node 500, the commissioning device 650 now uses a BLE-Zigbee tunnel, or alternatively it directly sends it from the central controller to each device 500 to deploy the role of each device 500 in the network, and to assign the final Zigbee short address to each device, such as according to (1) and (2). Same as in scenario 2, the RSSI/neighbour information may also be obtained via a Zigbee network (e.g. from Link Status messages), when the Zigbee network is already formed, such as for later updates of the network.

Scenario 4. BLE+Zigbee (Automatic Selection of Router Nodes and no Manual Joining at All)

In this scenario, the central controller 600 opens the Zigbee network 100 and all nodes 500 autojoin this Zigbee network one by one. Each new node that joins the network sends a device announcement. After the central controller 600 receives this announcement, the central controller 600 sends a Zigbee command to the new node that designates the node temporarily to be a router 400 or a non-router device 300. The controller may maintain a counter and designates the first and every n'th device to be a temporary router 400 and the other (n−1) devices in-between to be non-routers 300.

After the formation of the entire network in this way, the network controller 600 queries all devices 500 or only the temporary router devices 400 for their BLE (and/or Zigbee) neighbour tables, calculates the optimized set of router devices 200 and non-router devices 300, for which every router device and non-router device has sufficient neighbouring router devices to be able to set up a route towards the central controller 600. Using the temporary Zigbee short address of each node 500 the controller sends Zigbee unicast messages to each of the nodes 500 to deploy the final role of each device 500 and to assign the final Zigbee short address to each device 500, which may again reflect the rule according to (1) and (2).

The above scenario could also be done using a commissioning device 650 that uses a first node as a proxy device and sends all Zigbee commands over the BLE-Zigbee tunnel. Moreover, the above scenario could also be done using InterPAN messages instead of BLE advertisements to create the BLE neighbour tables.

In some of the scenarios described above it can be beneficial to selectively power parts or subsets of the network and add these parts one-by-one to the overall network. In this way we do not get into a situation where we have more than 100-200 nodes which are router nodes during the overall commissioning process. Also, the situation that 100-200 devices start to send beacon requests at the same time is also avoided. This may be especially useful in the cases where auto-joining is used, which will reduce the overall time spent in establishing the network.

Extensions for All Scenarios

The (short) addressing scheme and the router/non-router relations described above, if aligned with the network topology/logical grouping, can be quite beneficial, when the central controller 600 needs to query the status of certain devices 200,300 in the network. Instead of querying each device one by one, it could query just the router devices 200. The router devices 200 could either already pre-load the status information by regularly querying their children/associated non-router devices 300 (via one-hop unicasts) or do this on-demand. In both cases, the router devices 200 will send the status information on behalf of themselves and all their children/associated non-router devices, which significantly cuts down the number of messages being sent over multiple hops.

Additionally, the router nodes 200 could detect in this way if child nodes somehow missed a broadcast message and 'repair' this by sending a unicast message to the affected child node.

Furthermore, the assignment of Zigbee groups could benefit from the semi-automatic commissioning process described above if the router nodes and their associated non-router nodes are in the same Zigbee group. In such a scenario, the assignment of Zigbee groups could be done by assigning the router immediately after joining the network and let the router device 200 assigns its children to the same Zigbee group number after they join the network. The same approach may also be applied to the selective powering scheme.

Figure 4:
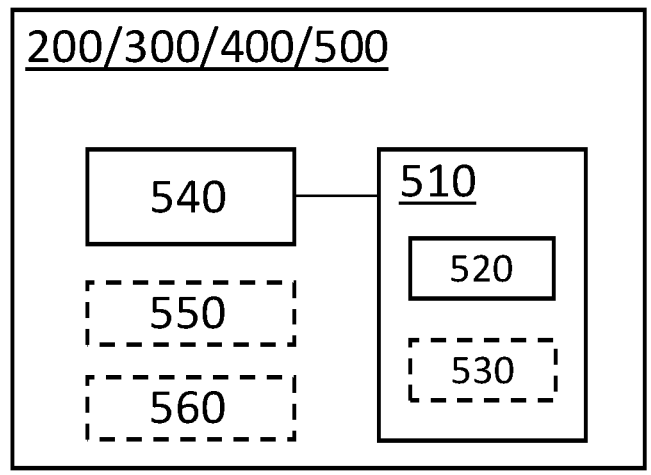
FIG. 4 schematically depicts basic components of a node out of the plurality of nodes in a wireless system.

FIG. 4 schematically depicts basic components of a node out of the plurality of nodes 200, 300, 400, 500 in a wireless system 100. The node 200, 300, 400, 500 comprises a radio unit 510, which is capable to operate according to at least one or both of a first communication protocol capable to support a mesh or tree network with multi-hop routing, and a second communication protocol capable to support a point-to-point connection. The radio unit 510 may be a combo device to support both the first and the second communication protocols and operate in a time-interleaved manner according to either one of the two communication protocols. The radio unit 510 may comprise two separate single mode transceivers 520, 530, and each supports one communication protocol. The node 200, 300, 400, 500 further comprises a controller 540, which is configured to control the node to operate as a router node or non-router node according to the configuration.

Optionally, the node 200, 300, 400, 500 may further comprise an application controller and/or an actuator, as indicated by 550 in FIG. 4. The application controller or the actuator may be related to the control functionality of the node either in a lighting context or a broader building automation context. The application controller and/or an actuator may execute the control commands received by the node. And the status information is provided by the application controller and/or the actuator as a feedback to the control system.

In another option, the node 200, 300, 400, 500 may further comprise a sensor, as indicated by 560 in FIG. 4. The sensor 560 may be configured to detect presence and/or environmental information, such as temperature, humidity, etc. The sensing data may be collected in addition to or independent from the status information of the node, or the application controller and/or the actuator.

Figure 5:
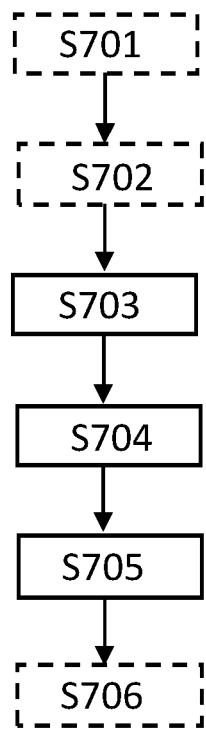
FIG. 5 shows a flow diagram of a method of commissioning a plurality of nodes to a wireless network.

FIG. 5 shows a flow diagram of a method 700 of commissioning a plurality of nodes to a wireless network. In step S703, one or more neighboring relationships are established among the plurality of nodes 500, and each one of the plurality of nodes 500 is found at least once by one of the one or more neighboring relationships. In step S704, a subset of nodes out of the plurality of nodes 500 is configured to operate as router nodes 200 by enabling a multi-hop routing capability for relaying messages in the wireless network; and the rest of the plurality of nodes, other than the router nodes, are configured in step S705 to operate as non-router nodes 300, which do not relay messages by disabling the multi-hop routing capability when present; and wherein the router nodes 200 and the non-router nodes 300 are configured based on the one or more neighboring relationships, such that within a direct communication range of a non-router node 300 there is at least one router node 200.

Optionally, the method 700 comprises a further step S706, in which each one of the non-router nodes is associated to a router node within a direct communication range, and wherein sending a unicast message to a non-router node is carried out via the corresponding router node.

In another example, the disclosed method 700 comprises two further steps: in step S701, a first subset of the plurality of nodes is preselected as temporary router nodes 400; and each temporary router node 400 is queried in step S702 for its neighboring relationship.

The method according to the present invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer or a processing means comprised in a node or a network or a commissioning device as disclosed in the above-described embodiments.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor and may also be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A method of commissioning a plurality of nodes to a wireless network operating according to a first communication protocol, the method comprising:
    establishing one or more neighboring relationships among the plurality of nodes, and each one of the plurality of nodes is present in at least one of the one or more neighboring relationships;
    configuring a subset of nodes out of the plurality of nodes to operate as router nodes by enabling a multi-hop routing capability for relaying messages in the wireless network; and
    configuring the rest of the plurality of nodes, other than the router nodes, to operate as non-router nodes, which do not relay messages by disabling the multi-hop routing capability when present;
and wherein the router nodes and the non-router nodes are configured based on the one or more neighboring relationships, such that within a direct communication range of a non-router node there is at least one router node;
and wherein establishing the one or more neighboring relationships among the plurality of nodes further comprises:
    preselecting a first subset of the plurality of nodes as temporary router nodes;
    querying each temporary router node for at least one neighboring relationship around each temporary router node;
wherein the temporary router nodes are preselected in such a manner that each one of the plurality of nodes is found at least once by one of the neighboring relationships queried from the temporary router nodes.

2. The method of claim 1, further comprising:
    associating each one of the non-router nodes to a router node within a direct communication range, and wherein sending a unicast message to a non-router node is carried out via the corresponding router node.

3. The method of claim 1, wherein to perform network maintenance after commissioning, the establishing the one or more neighboring relationships among the plurality of nodes, the configuring the subset of nodes out of the plurality of nodes, and the configuring the rest of the plurality of nodes are repeated on a regular basis or upon a trigger event, and the trigger event can be at least one of a change of a node's position, a change of a node's powering status, a change of a traffic pattern, a change of a system setup, and a change of a link quality between two nodes out of the plurality of nodes.

4. The method of claim 1, wherein the temporary router nodes are preselected one by one manually by a commissioning device via a point-to-point wireless connection according to a second communication protocol, or via the wireless network, and wherein the second communication protocol is different from the first communication protocol.

5. The method of claim 1, wherein the temporary router nodes are preselected automatically according to a pre-defined rule, either by the plurality of nodes themselves, or by a commissioning device via a point-to-point wireless connection according to a second communication protocol, or by a central controller on the wireless network, and wherein the second communication protocol is different from the first communication protocol.

6. The method of claim 4, wherein the wireless point-to-point connection is operated in accordance with a Bluetooth Low Energy (BLE) protocol.

7. The method of claim 1, the neighboring relationship is a neighboring table comprising a list of neighbor nodes out of the plurality of nodes within a direct communication range, and each node on the list is identified with a pre-defined unique identifier of that node.

8. The method of claim 1, the neighboring table further comprises a signal characteristic for each node on the list, the signal characteristic quantifying proximity to a respective neighbor node.

9. The method of claim 1, wherein the wireless network is operated in accordance with a Zigbee protocol.

10. The method of claim 2, wherein the selection of router nodes and non-router nodes further comprises an address assignment scheme of:
    assigning each one of the plurality of nodes a network address for operating on the wireless network, the network address comprising a first subfield and a second subfield; and
wherein the first subfield is set to a first value to uniquely distinguish a router node from another router node, and the first value is shared by the router node and one or more non-router nodes associated to the router node, and the second subfield is set to a second value to uniquely distinguish the router node and the one or more associated non-router nodes from one another; and wherein the first subfield of the network address is used for a unicast message to be addressed via multi-hop relaying to reach a router node, when the unicast message has an intended destination of either the router node or a non-router node associated to the router node; and the second subfield of the network address is to identify the intended destination out of the router node and the one or more non-router nodes associated to the router node.

11. The method of claim 1, wherein the wireless network is for lighting control, and/or for controlling sensors and gathering sensing data.

12. A wireless system, the wireless system comprising:
a plurality of nodes; and
a central controller configured to open a wireless network and to commission the plurality of nodes to the wireless network, the central controller configured to:
establish one or more neighboring relationships among the plurality of nodes, and each one of the plurality of nodes is present in at least one of the one or more neighboring relationships;
configure a subset of nodes out of the plurality of nodes to operate as router nodes by enabling a multi-hop routing capability for relaying messages in the wireless network; and
configure the rest of the plurality of nodes, other than the router nodes, to operate as non-router nodes, which do not relay messages by disabling the multi-hop routing capability when present;
wherein the router nodes and the non-router nodes are configured based on the one or more neighboring relationships, such that within a direct communication range of a non-router node there is at least one router node;
and wherein establishing the one or more neighboring relationships among the plurality of nodes further comprises:
preselecting a first subset of the plurality of nodes as temporary router nodes; and
querying each temporary router node for at least one neighboring relationship around each temporary router node;
wherein the temporary router nodes are preselected in such a manner that each one of the plurality of nodes is found at least.

13. A wireless system, the wireless system comprising:
a plurality of nodes;
a central controller configured to open a wireless network; and
a commissioning device configured to commission the plurality of nodes to the wireless network, the commissioning device configured to:
establish one or more neighboring relationships among the plurality of nodes, and each one of the plurality of nodes is present in at least one of the one or more neighboring relationships;
configure a subset of nodes out of the plurality of nodes to operate as router nodes by enabling a multi-hop routing capability for relaying messages in the wireless network; and
configure the rest of the plurality of nodes, other than the router nodes, to operate as non-router nodes, which do not relay messages by disabling the multi-hop routing capability when present;
wherein the router nodes and the non-router nodes are configured based on the one or more neighboring relationships, such that within a direct communication range of a non-router node there is at least one router node;
and wherein establishing the one or more neighboring relationships among the plurality of nodes further comprises:
preselecting a first subset of the plurality of nodes as temporary router nodes; and
querying each temporary router node for at least one neighboring relationship around each temporary router node;
wherein the temporary router nodes are preselected in such a manner that each one of the plurality of nodes is found at least.

14. A non-transitory computer readable medium comprising instructions, the instructions when executed by a plurality of nodes each comprising a processor, cause the respective processors to perform the method of claim 1 in a collective manner.

* * * * *